United States Patent Office 2,887,479
Patented May 19, 1959

2,887,479

HETEROCYCLIC QUATERNARY SALTS CONTAINING A CYCLOHEXENYLIDENEMETHYL SUBSTITUENT

Donald W. Heseltine, Rochester, N. Y., assignor to Eastman Kodak Company, Rochester, N.Y., a corporation of New Jersey No Drawing. Application November 15, 1955
Serial No. 547,047

17 Claims. (Cl. 260—240)

This invention relates to a method of preparing quaternary salts which are useful in the preparation of sensitizing dyes. More particularly, this invention relates to an improved method for making heterocyclic quaternary salts and to new products.

This application is a continuation-in-part of my application Serial No. 400,809, filed December 28, 1953 (now U.S. Patent 2,756,227, issued July 24, 1956).

British Patent 625,907, accepted July 6, 1949, describes a method for making heterocyclic quaternary salts which are useful in the preparation of photographic sensitizing dyes. However, the intermediates which are obtained according to the process described in this patent are evidently contaminated with a material which interferes with certain dye condensations. For example, the intermediates described in the British patent cannot be condensed with so-called ICI intermediates to produce dicarbocyanine dyes which can be isolated from the reaction mixture.

Accordingly, it would be desirable to have intermediates of the type described in British Patent 625,907 which were of sufficient purity to undergo condensations which cannot be undertaken using the British patent's intermediates.

It is, therefore, an object of my invention to provide an improved process for preparing intermediates useful in the preparation of photographic sensitizing dyes. A further object of my invention is to provide new intermediates which are useful in the preparation of photographic sensitizing dyes. Other objects will become apparent from a consideration of the following description and examples.

According to my invention, I realize the above objects by condensing together a cyclammonium quaternary salt selected from those represented by the following general formula:

I.

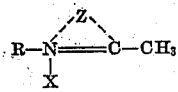

wherein R represents an alkyl group, such as methyl, ethyl, n-propyl, isopropyl, n-butyl, isobutyl, β-hydroxyethyl, carboxymethyl, carbethoxymethyl, β-methoxyethyl, benzyl (phenylmethyl), allyl (vinylmethyl), etc., X represents an anion, such as chloride, bromide, iodide, perchlorate, thiocyanate, acetate, methylsulfate, ethylsulfate, benzenesulfonate, toluenesulfonate, etc., and Z represents the non-metallic atoms necessary to complete a heterocyclic nucleus containing five atoms in the heterocyclic ring, such as those selected from the group consisting of those of the thiazole series (e.g., thiazole, 4-methylthiazole, 5-methylthiazole, 4-phenylthiazole, 5-phenylthiazole, 4,5-dimethylthiazole, 4,5-diphenylthiazole, 4-(2-thienyl)thiazole, etc.), those of the benzothiazole series, e.g., benzothiazole, 4-chlorobenzothiazole, 5-chlorobenzothiazole, 6-chlorobenzothiazole, 7-chlorobenzothiazole, 4-methylbenzothiazole, 5-methylbenzothiazole, 6-methylbenzothiazole, 5-bromobenzothiazole, 6-bromobenzothiazole, 4-phenylbenzothiazole, 5-phenylbenzothiazole, 4-methoxybenzothiazole, 5-methoxybenzothiazole, 6-methoxybenzothiazole, 5-iodobenzothiazole, 6-iodobenzothiazole, 4-ethoxybenzothiazole, 5-ethoxybenzothiazole, tetrahydrobenzothiazole, 5,6-dimethoxybenzothiazole, 5,6-dioxymethylenebenzothiazole, 5-hydroxybenzothiazole, 6-hydroxybenzothiazole, etc., those of the naphthothiazole series (e. g., α-naphthothiazole (i. e., [2,1]-naphthothiazole), β-naphthothiazole (i. e., [1,2]-naphthothiazole), 5-methoxy-β-naphthothiazole, 5-ethoxy-β-naphthothiazole, 7 - methoxy-α-naphthothiazole, 8-methoxy-α-naphthothiazole, etc.), those of the benzoxazole series (e. g., benzoxazole, 5-chlorobenzoxazole, 5-phenylbenzoxazole, 5-methylbenzoxazole, 6-methylbenzoxazole, 5,6-dimethylbenzoxazole, 4,6-dimethylbenzoxazole, 5-methoxybenzoxazole, 6-methoxybenzoxazole, 5-ethoxybenzoxazole, 6-chlorobenzoxazole, 5-hydroxybenzoxazole, 6-hydroxybenzoxazole, etc.), those of the naphthoxazole series (e. g., α-naphthoxazole, β-naphthoxazole, etc.), those of the benzoselenazole series (e. g., benzoselenazole, 5-chlorobenzoselenazole, 5-methoxybenzoselenazole, 5-hydroxybenzoselenazole, tetrahydrobenzoselenazole, etc.), those of the naphthoselenazole series (e. g., α-naphthoselenazole, β-naphthoselenazole, etc.), those of the thiazoline series (e. g., thiazoline, 4-methylthiazoline, etc.), with a ketone selected from those represented by the following general formula:

II.

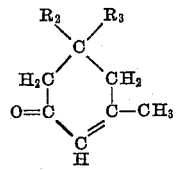

wherein R₂ represents a hydrogen atom or a methyl group, and R₃ represents a hydrogen atom, an alkyl group, such as methyl, ethyl, n-propyl, isopropyl, n-butyl, isobutyl, benzyl (phenylmethyl), etc., a monocyclic aryl group, such as phenyl, o-, m-, and p-tolyl, p-methoxyphenyl, etc., or a furyl group.

The condensation of the compounds represented by Formula I with those of Formula II can advantageously be accelerated by heating. The particular temperature used to be varied, depending on the boiling point of the reactants. For example, the reaction can be accelerated by simply heating the reactants together under reflux. In general, I have found that a temperature of from about 100 to 200° C. is useful in practicing my invention. While an inert medium can be employed, if desired, there is generally no advantage in using such a medium, inasmuch as such use merely necessitates an additional purification step in the removal of the solvent.

The intermediates selected from those represented by Formula I above have been previously described in the art. See, for example, Brooker and White U.S. Patent 2,646,409, issued July 21, 1953; Dent and Brooker U.S. Patent 2,537,880, issued January 9, 1951; and Pittman U.S. Patent 2,521,944, issued September 12, 1950.

The intermediates selected from those represented by Formula II above are also well known in the art. Representative ketones include, for example, 3,5-dimethyl-2-cyclohexene-1-one, 3-methyl-2-cyclohexene-1-one, 5-ethyl-3-methyl-2-cyclohexene-1-one, 5-furyl-3-methyl-2-cyclohexene-1-one, 3-methyl-5-phenyl-2-cyclohexene-1-one, etc.

The condensation of the compounds of Formula I with those of Formula II results in the formation of intermediates, useful in the preparation of photographic sensitizing dyes, represented by the following general formula:

III.

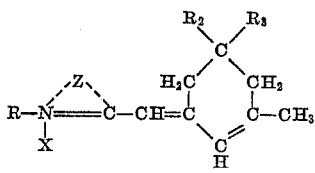

wherein R, $R_2$, $R_3$, X and Z each have the values given above.

The following examples will serve to illustrate more fully the manner whereby I practice my invention.

EXAMPLE 1

*3-ethyl-2-(1,5,5-trimethyl-3-cyclohexenylidene)-methylbenzothiazolium iodide*

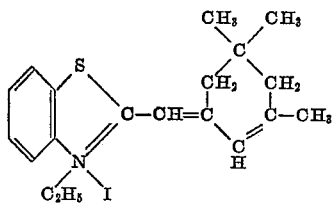

3 ethyl-2-methylbenzothiazolium-p-toluenesulfonate (1 mol., 34.9 g.) and isophorone (2 mols., 27.6 g.) were mixed in a 500 ml. flask fitted with an air condenser and a water take-off. The reaction mixture was heated in an oil bath at 140° C. for 16 hours and then poured hot into a 1500 ml. beaker and mechanically stirred with 200 ml. water. The mixture was extracted with five 200 ml. portions of ether and then the aqueous portion was treated with an aqueous solution of sodium iodide (15 g.) in water (50 ml.). After chilling overnight, the crude product was filtered off, thoroughly washed with water and dried. After recrystallization from ethyl alcohol, the yield of purified product was 14.7 g. (35%), M.P. 233–234° C. dec.

EXAMPLE 2

*5-chloro-3-ethyl-2-(1,5,5-trimethyl-3-cyclohexenylidene)-methylbenzothiazolium p-toluenesulfonate*

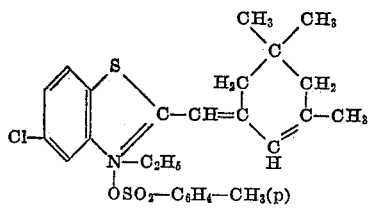

5-chloro-3-ethyl-2-methylbenzothiazolium p-toluenesulfonate (38.4 g., 1 mol.) and isophorone (27.6 g., 1 mol. plus 100%) were mixed and heated on the oil bath at 135–140° C. for 16 hours. The hot reaction mixture was poured into a beaker and mechanically stirred with water (400 ml.) and five 300 ml. portions of ether. The ether and water solutions were decanted and the residue dissolved in boiling water (1200 ml.), filtered, and chilled overnight. The product was then filtered off, washed with water and acetone and dried. The yield of desired product was 18.3 g. (36%). M.P. 233–4° C. dec.

EXAMPLE 3

*3-ethyl-2-(1,5,5-trimethyl-3-cyclohexenylidene)-methylbenzoxazolium iodide*

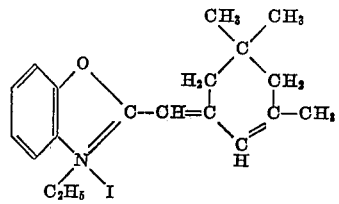

2-methylbenzoxazole (13.3 g., 1 mol.), ethyl p-toluenesulfonate (20.0 g., 1 mol.) and isophorone (27.6 g., 1 mol. plus 100%) where mixed and heated on the oil bath at 135–140° C. for 16 hours. The reaction mixture was then poured into water (600 ml.) and mechanically stirred with four 500 ml. portions of ether. An additional 500 ml. of ether was added and the mixture stirred with sodium iodide (20 g.). After chilling for several days, the crystalline product was filtered off, stirred with a little acetone, chilled, filtered, and dried. The yield of product was 4.3 g. (10.4%). M.P. 217–18° C. dec.

EXAMPLE 4

*3 - ethyl - 2 - (1,5,5 - trimethyl - 3 - cyclohexenylidene)-methylbenzoselenazolium iodide*

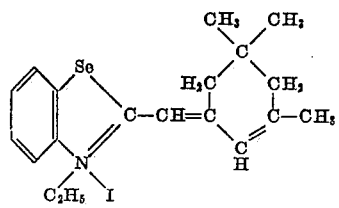

2-methylbenzoselenazole (19.6 g., 1 mol.) and diethylsulfate (15.4 g., 1 mol.) were mixed and heated at 70° C. on the oil bath for 24 hours. Isophorone (27.6 g., 1 mol. plus 100%) was then added and the mixture heated at 135–140° C. for 16 hours. The reaction mixture was poured into water (800 ml.) and stirred with four 500 ml. portions of ether. The ether was decanted and the aqueous portion treated with sodium iodide (20 g.). The water was decanted and the residue washed with water, boiled with acetone, chilled, filtered, and dried. The yield of product was 8.5 g. (18%). M.P. 223–4° C. dec.

EXAMPLE 5

*2 - (1,5 - dimethyl - 3 - cyclohexenylidene)methyl - 3 - ethylbenzothiazolium iodide*

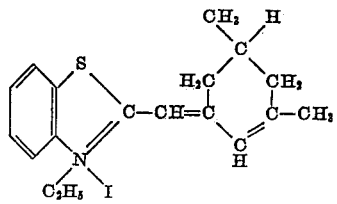

3 - ethyl - 2 - methylbenzothiazolium p - toluenesulfonate (34.9 g., 1 mol.) and 3,5 - dimethyl - 2 - cyclohexene - 1 - one (24.8 g., 1 mol. plus 100%) were mixed and heated at 135–140° C. for 16 hours. The reaction mixture was poured into water (400 ml.) and stirred with four 500 ml. portions of ether. The ether solutions were decanted and the aqueous portion was treated with sodium iodide (20 g.) and chilled overnight. The aqueous solution was then decanted, the residue washed with water, and stirred with acetone until crystalline. After recrystallization from ethyl alcohol, the yield of product was 6.5 g. (16%). M.P. 236–7° C. dec.

EXAMPLE 6

*1 - ethyl - 2 - (1,5,5 - trimethyl - 3 - cyclohexenylidene)- methylnaphtho[1,2]thiazolium iodide*

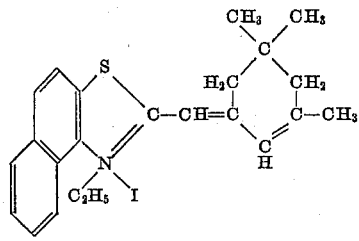

1 - ethyl - 2 - methylnaphtho[1,2]thiazolium p - toluenesulfonate (39.9 g., 1 mol.) and isophorone (27.6 g., 1 mol. plus 100%) were mixed and heated in an oil bath at 165–170° C. for 24 hours. The reaction mixture was poured into a beaker and mechanically stirred with water (400 ml.) and five 400 ml. portions of ether. The ether and water solutions were decanted and the residue extracted with boiling water (3000 ml.). The aqueous solution was then filtered, stirred with sodium iodide and chilled overnight. The crude product was filtered off, washed with water, stirred with acetone, filtered, and dried. After recrystallization from ethyl alcohol, the yield was 10.8 g. (23%). M.P. 208–9° C. dec.

EXAMPLE 7

*1-ethyl-2-(1,5,5-trimethylcyclohexenylidene)methyl- naphtho[2,1]thiazolium iodide*

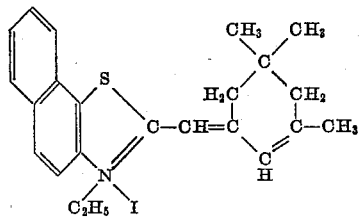

2-methylnaphtho[2,1]thiazole (39.8 g., 1 mol.), ethyl p-toluenesulfonate (40 g., 1 mol.) and isophorone (30.3 g., 1 mol. plus 10%) were mixed in a 500 ml. flask fitted with a water take-off and an air condenser. The reaction mixture was heated in an oil bath at 135–140° C. for 3 days. The reaction mixture was then poured into water (800 ml.) and stirred and extracted with four 800 ml. portions of ether. The ether solutions were discarded and the aqueous layer decanted. The residue was then extracted with boiling water (800 ml.) and the aqueous solutions combined, saturated with ammonium chloride and chilled overnight. The product was filtered, dissolved in water (100 ml.) and converted to the bromide by the addition of sodium bromide (10 g.). The crude bromide was filtered off, washed with acetone and dried. Yield 6.5 g. An additional 7.3 g. was isolated as the iodide by treating the combined filtrates with sodium iodide (20 g.). The crude iodide was boiled with two 400 ml. portions of water, washed with acetone and dried. The combined yield was 15.3% and the iodide after recrystallization from methyl alcohol had M. P. 252–3° C. dec.

EXAMPLE 8

*3-ethyl-2-(3-methyl-2-cyclohexenylidene)methylbenzo- thiazolium iodide*

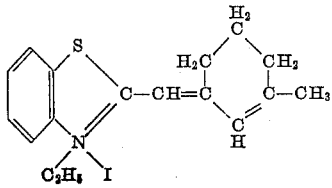

3-methyl-2-cyclohexene-1-one (11.0 g., 1 mol. plus 100%) and 3-ethyl-2-methylbenzothiazolium p-toluenesulfonate (17.5 g., 1 mol.) were mixed and heated in an oil bath at 145–150° C. for two days. The reaction mixture was then poured into water (100 ml.) and extracted with four 500 ml. portions of ether. The ethereal solutions were decanted and the aqueous portion heated to boiling. 10 g. of a filter aid (Super-Cel) were then added with stirring and the solution filtered. The filtrate was treated with sodium iodide (10 g.) and chilled overnight. The aqueous solution was decanted and the residue stirred with acetone (25 ml.) until crystalline. After chilling, the crude product (6.25 g., 31.5%) was filtered off and dried. After recrystallization from methyl alcohol, the yield was 4.53 g. (23%) and the yellow needles had M.P. 224–5° C. dec.

Operating in a similar manner, other cyclammonium quaternary salts selected from those represented by Formula I can be reacted with other ketones selected from those represented by Formula II. As noted above, the resulting intermediates represented by Formula III can advantageously be employed through condensation with intermediates such as those shown in Examples 9 and 10 or Dains intermediates to produce polymethine dyes useful in altering the sensitivity of photographic silver halide emulsions. The preparation of such dyes is described in my copending application Serial No. 400,810, filed December 28, 1953, now U.S. Patent 2,734,900, issued February 14, 1956. Other examples follow:

EXAMPLE 9

*3,3' - diethyl - 11,13 - trimethyleneoxathiatricarbocyanine iodide*

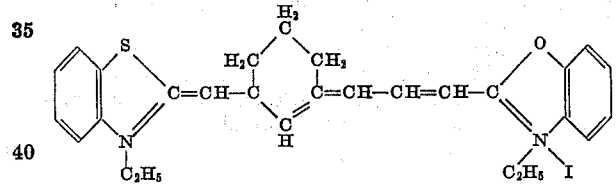

3-ethyl-2-(3-methyl-2-cyclohexenylidene)methylbenzo- thiazolium iodide (0.99 g., 1 mol.), 2-β-acetanilidovinyl- 3-ethylbenzoxazolium iodide (1.09 g., 1 mol.) and triethylamine (0.7 ml., 1 mol. plus 100%) were dissolved in pyridine (10 ml.) and heated under reflux for ten minutes. The reaction mixture was then stirred with water (100 ml.) and ether (200 ml.) until crystallization started. After chilling overnight, the crude dye (0.30 g., 21%) was filtered off, washed with a little methyl alcohol and dried. After two recrystallizations from methyl alcohol, the yield of purified dye was 8%, M.P. 237–8° C. dec.

EXAMPLE 10

*3,3'-diethyl-9,11-trimethylenethiatricarbocyanine iodide*

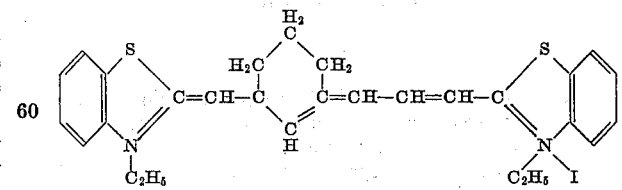

3-ethyl-2-(3-methyl-2-cyclohexenylidene)methylbenzo- thiazolium iodide (0.99 g., 1 mol.), 2-β-acetanilidovinyl-3- ethylbenzothiazolium iodide (1.13 g., 1 mol.) and triethylamine (0.7 ml., 1 mol. plus 100%) were dissolved in pyridine (10 ml.) and heated under reflux for twenty minutes. The reaction mixture was then poured into water (100 ml.) and stirred with ether (200 ml.) until crystallization started. After chilling overnight, the crude dye (0.25 g., 17%) was filtered off, washed with water and ether and dried. After two crystallizations from methyl alcohol, the yield of pure dye was 0.13 g. (9%), M.P. 242–3° C. dec.

Super-Cel is a diatomaceous earth (used in Example 8).

What I claim as my invention and desire secured by Letters Patent of the United States is:

1. A process for making heterocyclic compounds comprising heating together at a temperature of from 100 to 200° C. a compound selected from those represented by the following general formula:

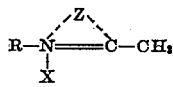

wherein R represents an alkyl group of the formula $C_nH_{2n+1}$ wherein $n$ represents a positive integer of from 1 to 4, X represents an anion, and Z represents the non-metallic atoms necessary to complete a heterocyclic nucleus selected from the group consisting of a thiazole nucleus, a benzothiazole nucleus, a naphthothiazole nucleus, a benzoxazole nucleus, a naphthoxazole nucleus, a benzoselenazole nucleus, a naphthoselenazole nucleus, and a thiazoline nucleus with a ketone selected from those represented by the following general formula:

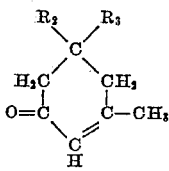

wherein $R_2$ and $R_3$ each represents a member selected from the group consisting of a hydrogen atom and a methyl group, and separating said heterocyclic compounds from the reaction mixture.

2. A process for preparing heterocyclic compounds comprising heating together at a temperature of from 100 to 200° C. a compound selected from those represented by the following general formula:

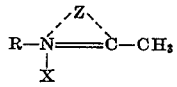

wherein R represents an alkyl group of the formula $C_nH_{2n+1}$ wherein $n$ represents a positive integer of from 1 to 4, X represents an anion and Z represents the non-metallic atoms necessary to complete a benzothiazole nucleus, with a ketone selected from those represented by the following general formula:

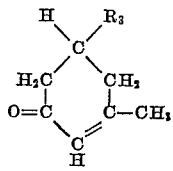

wherein $R_3$ represents an alkyl group containing from 1 to 4 carbon atoms, and separating said heterocyclic compounds from the reaction mixture.

3. A process for preparing heterocyclic compounds comprising heating together at a temperature of from 100 to 200° C. a compound selected from those represented by the following general formula:

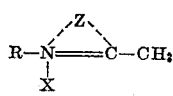

wherein R represents an alkyl group of the formula $C_nH_{2n+1}$ wherein $n$ represents a positive integer of from 1 to 4, X represents an anion and Z represents the non-metallic atoms necessary to complete a benzothiazole nucleus with isophorone, and separating said heterocyclic compounds from the reaction mixture.

4. A process for preparing heterocyclic compounds comprising heating together at a temperature of from 100 to 200° C. a compound selected from those represented by the following general formula:

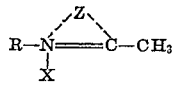

wherein R represents an alkyl group of the formula $C_nH_{2n+1}$ wherein $n$ represents a positive integer of from 1 to 4, X represents an anion and Z represents the non-metallic atoms necessary to complete a naphthothiazole nucleus with isophorone, and separating said heterocyclic compounds from the reaction mixture.

5. A process comprising heating together at a temperature of from 100 to 200° C. 3-ethyl-2-methylbenzothiazolium p-toluenesulfonate with 3,5-dimethyl-2-cyclohexene-1-one, and separating the resulting heterocyclic quaternary salt from the reaction mixture.

6. A process comprising heating together at a temperature of from 100 to 200° C. 3-ethyl-2-methylbenzothiazolium p-toluenesulfonate with isophorone, and separating the resulting heterocyclic quaternary salt from the reaction mixture.

7. A process comprising heating together at a temperature of from 100 to 200° C. 1-ethyl-2-methylnaphtho[1,2]thiazolium p-toluenesulfonate with isophorone, and separating the resulting heterocyclic quaternary salt from the reaction mixture.

8. A process for preparing heterocyclic compounds comprising heating together at a temperature of from 100 to 200° C. a compound selected from those represented by the following general formula:

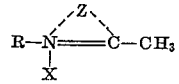

wherein R represents an alkyl group of the formula $C_nH_{2n+1}$ wherein $n$ represents a positive integer of from 1 to 4, X represents an anion and Z represents the non-metallic atoms necessary to complete a benzothiazole nucleus with 3-methyl-2-cyclohexene-1-one, and separating the resulting heterocyclic compound from the reaction mixture.

9. A process comprising heating together at a temperature of from 100 to 200° C. 3-ethyl-2-methylbenzothiazolium p-toluenesulfonate with 3-methyl-2-cyclohexene-1-one, and separating the resulting heterocyclic quaternary salt from the reaction mixture.

10. A process for preparing heterocyclic compounds comprising heating together at a temperature of from 100 to 200° C. a compound selected from those represented by the following general formula:

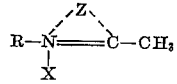

wherein R represents an alkyl group of the formula $C_nH_{2n+1}$ wherein $n$ represents a positive integer of from 1 to 4, X represents an anion and Z represents the non-metallic atoms necessary to complete a benzoselenazole nucleus with isophorone, and separating the resulting heterocyclic compounds from the reaction mixture.

11. A process comprising heating together at a temperature of from 100 to 200° C. 3-ethyl-2-methylbenzoselenazolium ethosulfate with isophorone, and separating the resulting heterocyclic quaternary salt from the reaction salt from the reaction mixture.

12. A heterocyclic compound selected from those represented by the following general formula:

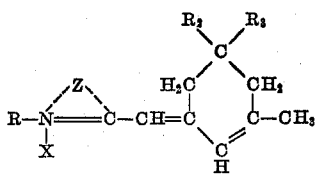

wherein R represents an alkyl group of the formula $C_nH_{2n+1}$ wherein $n$ represents a positive integer of from 1 to 4, $R_2$ and $R_3$ each represents a member selected from the group consisting of a hydrogen atom and a methyl group, X represents an anion, and Z represents the non-metallic atoms necessary to complete a heterocyclic nucleus selected from the group consisting of a thiazole nucleus, a benzothiazole nucleus, a naphthothiazole nucleus, a benzoxazole nucleus, a naphthoxazole nucleus, a benzoselenazole nucleus, a naphthoselenazole nucleus, and a thiazoline nucleus.

13. A compound having the following formula:

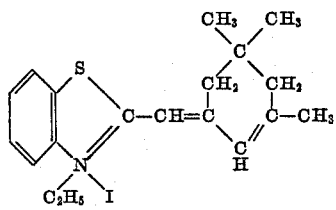

14. A compound having the following formula:

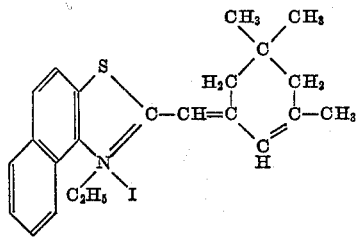

15. A compound having the following formula:

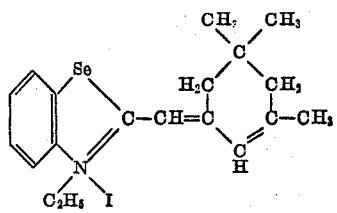

16. A compound having the following formula:

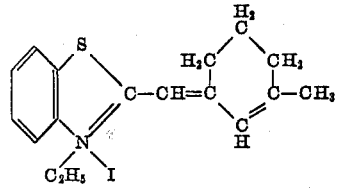

17. A compound having the following formula:

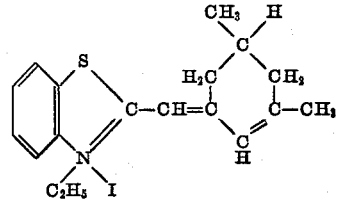

References Cited in the file of this patent
UNITED STATES PATENTS

| | | |
|---|---|---|
| 2,734,900 | Heseltine | Feb. 14, 1956 |
| 2,756,227 | Heseltine | July 24, 1956 |

FOREIGN PATENTS

| | | |
|---|---|---|
| 595,785 | Great Britain | Dec. 16, 1947 |
| 625,907 | Great Britain | July 6, 1949 |

UNITED STATES PATENT OFFICE

CERTIFICATE OF CORRECTION

Patent No. 2,887,479 May 19, 1959

Donald W. Heseltine

It is hereby certified that error appears in the printed specification of the above numbered patent requiring correction and that the said Letters Patent should read as corrected below.

Column 4, line 16, for "where" read -- were --; column 8, lines 74 and 75, strike out "from the reaction salt".

Signed and sealed this 13th day of October 1959.

(SEAL)

Attest:

KARL H. AXLINE
Attesting Officer

ROBERT C. WATSON
Commissioner of Patents